(12) United States Patent
Middlemiss

(10) Patent No.: US 7,726,421 B2
(45) Date of Patent: Jun. 1, 2010

(54) DIAMOND-BONDED BODIES AND COMPACTS WITH IMPROVED THERMAL STABILITY AND MECHANICAL STRENGTH

(75) Inventor: Stewart N. Middlemiss, Salt Lake City, UT (US)

(73) Assignee: Smith International, Inc., Houston, TX (US)

(*) Notice: Subject to any disclaimer, the term of this patent is extended or adjusted under 35 U.S.C. 154(b) by 874 days.

(21) Appl. No.: 11/249,164

(22) Filed: Oct. 12, 2005

(65) Prior Publication Data

US 2007/0079994 A1   Apr. 12, 2007

(51) Int. Cl.
*E21B 10/46* (2006.01)
(52) U.S. Cl. .................... 175/434; 175/420.2
(58) Field of Classification Search ........... 175/420.2, 175/426, 432, 434; 428/408
See application file for complete search history.

(56) References Cited

U.S. PATENT DOCUMENTS

| | | | |
|---|---|---|---|
| 3,136,615 A | 6/1964 | Bovenkerk |
| 3,141,746 A | 7/1964 | DeLai |
| 3,233,988 A | 2/1966 | Wentorf, Jr. |
| 3,745,623 A | 7/1973 | Wentorf, Jr. et al. |
| 4,108,614 A | 8/1978 | Mitchell |
| 4,151,686 A | 5/1979 | Lee et al. |
| 4,224,380 A | 9/1980 | Bovenkerk et al. |
| 4,255,165 A | 3/1981 | Dennis et al. |
| 4,268,276 A | 5/1981 | Bovenkerk |
| 4,288,248 A | 9/1981 | Bovenkerk et al. |
| 4,303,442 A | 12/1981 | Hara et al. |
| 4,311,490 A | 1/1982 | Bovenkerk et al. |
| 4,373,593 A | 2/1983 | Phaal et al. |
| 4,387,287 A | 6/1983 | Marazzi |
| 4,412,980 A | 11/1983 | Tsuji et al. |
| 4,481,016 A | 11/1984 | Campbell et al. |

(Continued)

FOREIGN PATENT DOCUMENTS

EP          0196777         10/1986

(Continued)

OTHER PUBLICATIONS

Translation of Japanese Unexamined Patent Application No. S59-218500. "Diamond Sintering and Processing Method," Shuji Yatsu and Tetsuo Nakai, inventors; Application published Dec. 10, 1984; Applicant: Sumitomo Electric Industries Co. Ltd. Office Action by USPTO mailed Mar. 11, 2003 for related U.S. Appl. No. 10/065604.

*Primary Examiner*—Daniel P Stephenson
(74) *Attorney, Agent, or Firm*—Connolly Bove Lodge & Hutz LLP

(57) ABSTRACT

Thermally stable diamond-bonded compacts include a diamond-bonded body having a thermally stable region extending a distance below a diamond-bonded body surface. The thermally stable region comprises a matrix first phase of bonded together diamond crystals, and a second phase interposed within the matrix phase. At least some population of the second phase comprises a reaction product formed between an infiltrant material and the diamond crystals at high pressure/high temperature conditions. The diamond bonded body further includes a polycrystalline diamond region that extends a depth from the thermally stable region and has a microstructure comprising a polycrystalline diamond matrix phase and a catalyst material disposed within interstitial regions of the matrix phase. The compact includes a substrate attached to the diamond-bonded body.

17 Claims, 8 Drawing Sheets

U.S. PATENT DOCUMENTS

| | | |
|---|---|---|
| 4,486,286 A | 12/1984 | Lewin et al. |
| 4,504,519 A | 3/1985 | Zelez |
| 4,522,633 A | 6/1985 | Dyer |
| 4,525,179 A | 6/1985 | Gigl |
| 4,534,773 A | 8/1985 | Phaal et al. |
| 4,556,403 A | 12/1985 | Almond et al. |
| 4,560,014 A | 12/1985 | Geczy |
| 4,570,726 A | 2/1986 | Hall |
| 4,572,722 A | 2/1986 | Dyer |
| 4,604,106 A | 8/1986 | Hall |
| 4,605,343 A | 8/1986 | Hibbs, Jr. et al. |
| 4,606,738 A | 8/1986 | Hayden |
| 4,621,031 A | 11/1986 | Scruggs |
| 4,636,253 A | 1/1987 | Nakai et al. |
| 4,645,977 A | 2/1987 | Kurokawa et al. |
| 4,662,348 A | 5/1987 | Hall et al. |
| 4,664,705 A | 5/1987 | Horton et al. |
| 4,670,025 A | 6/1987 | Pipkin |
| 4,707,384 A | 11/1987 | Schachner et al. |
| 4,726,718 A | 2/1988 | Meskin et al. |
| 4,766,040 A | 8/1988 | Hillert et al. |
| 4,776,861 A | 10/1988 | Frushour |
| 4,784,023 A | 11/1988 | Dennis |
| 4,792,001 A | 12/1988 | Zijsling |
| 4,793,828 A | 12/1988 | Burnand |
| 4,797,241 A | 1/1989 | Peterson et al. |
| 4,798,026 A | 1/1989 | Cerceau |
| 4,802,539 A | 2/1989 | Hall et al. |
| 4,807,402 A | 2/1989 | Rai |
| 4,828,582 A | 5/1989 | Frushour |
| 4,844,185 A | 7/1989 | Newton, Jr. et al. |
| 4,861,350 A | 8/1989 | Phaal et al. |
| 4,871,377 A | 10/1989 | Frushour |
| 4,899,922 A | 2/1990 | Slutz et al. |
| 4,919,220 A | 4/1990 | Fuller et al. |
| 4,940,180 A | 7/1990 | Martell |
| 4,943,488 A | 7/1990 | Sung et al. |
| 4,944,772 A | 7/1990 | Cho |
| 4,976,324 A | 12/1990 | Tibbitts |
| 4,985,051 A * | 1/1991 | Ringwood ............ 51/309 |
| 5,011,514 A | 4/1991 | Cho et al. |
| 5,027,912 A | 7/1991 | Juergens |
| 5,030,276 A | 7/1991 | Sung et al. |
| 5,032,147 A | 7/1991 | Frushour |
| 5,037,704 A | 8/1991 | Nakai et al. |
| 5,092,687 A | 3/1992 | Hall |
| 5,116,568 A | 5/1992 | Sung et al. |
| 5,127,923 A | 7/1992 | Bunting et al. |
| 5,135,061 A | 8/1992 | Newton, Jr. |
| 5,176,720 A | 1/1993 | Martell et al. |
| 5,186,725 A | 2/1993 | Martell et al. |
| 5,199,832 A | 4/1993 | Meskin et al. |
| 5,205,684 A | 4/1993 | Meskin et al. |
| 5,213,248 A | 5/1993 | Horton et al. |
| 5,238,074 A | 8/1993 | Tibbitts et al. |
| 5,264,283 A | 11/1993 | Waldenstrom |
| 5,337,844 A | 8/1994 | Tibbitts |
| 5,370,195 A | 12/1994 | Keshavan et al. |
| 5,379,853 A | 1/1995 | Lockwood |
| 5,439,492 A | 8/1995 | Anthony et al. |
| 5,464,068 A | 11/1995 | Najafi-Sani |
| 5,468,268 A | 11/1995 | Tank et al. |
| 5,496,638 A | 3/1996 | Waldenstrom |
| 5,505,748 A | 4/1996 | Tank et al. |
| 5,510,193 A | 4/1996 | Cerutti et al. |
| 5,523,121 A | 6/1996 | Anthony et al. |
| 5,524,719 A | 6/1996 | Dennis |
| 5,560,716 A | 10/1996 | Tank et al. |
| 5,607,024 A | 3/1997 | Keith et al. |
| 5,620,382 A | 4/1997 | Cho et al. |
| 5,624,068 A | 4/1997 | Waldenstrom et al. |
| 5,645,617 A | 7/1997 | Frushour |
| 5,667,028 A | 9/1997 | Truax et al. |
| 5,718,948 A | 2/1998 | Ederyd et al. |
| 5,722,499 A | 3/1998 | Nguyen et al. |
| 5,776,615 A | 7/1998 | Wong et al. |
| 5,833,021 A | 11/1998 | Mensa-Wilmot et al. |
| 5,897,942 A | 4/1999 | Karner et al. |
| 5,954,147 A | 9/1999 | Overstreet et al. |
| 5,979,578 A | 11/1999 | Packer |
| 6,009,963 A | 1/2000 | Chaves et al. |
| 6,063,333 A | 5/2000 | Dennis |
| 6,123,612 A | 9/2000 | Goers |
| 6,126,741 A | 10/2000 | Jones et al. |
| 6,234,261 B1 | 5/2001 | Evans et al. |
| 6,248,447 B1 | 6/2001 | Griffin et al. |
| 6,269,894 B1 | 8/2001 | Griffin |
| 6,344,149 B1 | 2/2002 | Oles |
| 6,410,085 B1 | 6/2002 | Griffin et al. |
| 6,435,058 B1 | 8/2002 | Matthias et al. |
| 6,544,308 B2 | 4/2003 | Griffin et al. |
| 6,592,985 B2 | 7/2003 | Griffin et al. |
| 6,601,662 B2 | 8/2003 | Matthias et al. |
| 2002/0023733 A1 | 2/2002 | Hall |
| 2005/0139397 A1 | 6/2005 | Achilles |
| 2005/0263328 A1 | 12/2005 | Middlemiss |
| 2006/0217258 A1 | 9/2006 | Zhao |
| 2007/0181348 A1 | 8/2007 | Lancaster et al. |

FOREIGN PATENT DOCUMENTS

| | | |
|---|---|---|
| EP | 0297071 | 12/1988 |
| EP | 0300699 | 1/1989 |
| EP | 0352811 | 1/1990 |
| EP | 0374424 | 6/1990 |
| EP | 0329954 | 8/1993 |
| EP | 0617207 | 9/1994 |
| EP | 0585631 | 4/1997 |
| EP | 0787820 | 8/1997 |
| EP | 0500253 | 11/1997 |
| EP | 0595630 | 1/1998 |
| EP | 0612868 | 7/1998 |
| EP | 0860515 | 8/1998 |
| EP | 1 190 791 | 3/2002 |
| GB | 1349385 | 4/1974 |
| GB | 2048927 | 12/1980 |
| GB | 2261894 | 6/1993 |
| GB | 2268768 | 1/1994 |
| GB | 2323398 | 9/1998 |
| GB | 2431948 | 5/2007 |
| GB | 2413813 | 11/2008 |
| GB | 2408735 | 1/2009 |
| JP | 8176696 | 7/1996 |
| RU | 2034937 | 5/1995 |
| RU | 566439 | 1/2000 |
| SU | 990486 | 1/1983 |
| WO | WO 93/23204 | 11/1993 |
| WO | WO 96/34131 | 10/1996 |
| WO | WO 00/28106 | 5/2000 |
| WO | WO 2004/040095 | 5/2004 |
| WO | WO 2004/106003 | 12/2004 |
| WO | WO 2004/106004 | 12/2004 |

\* cited by examiner

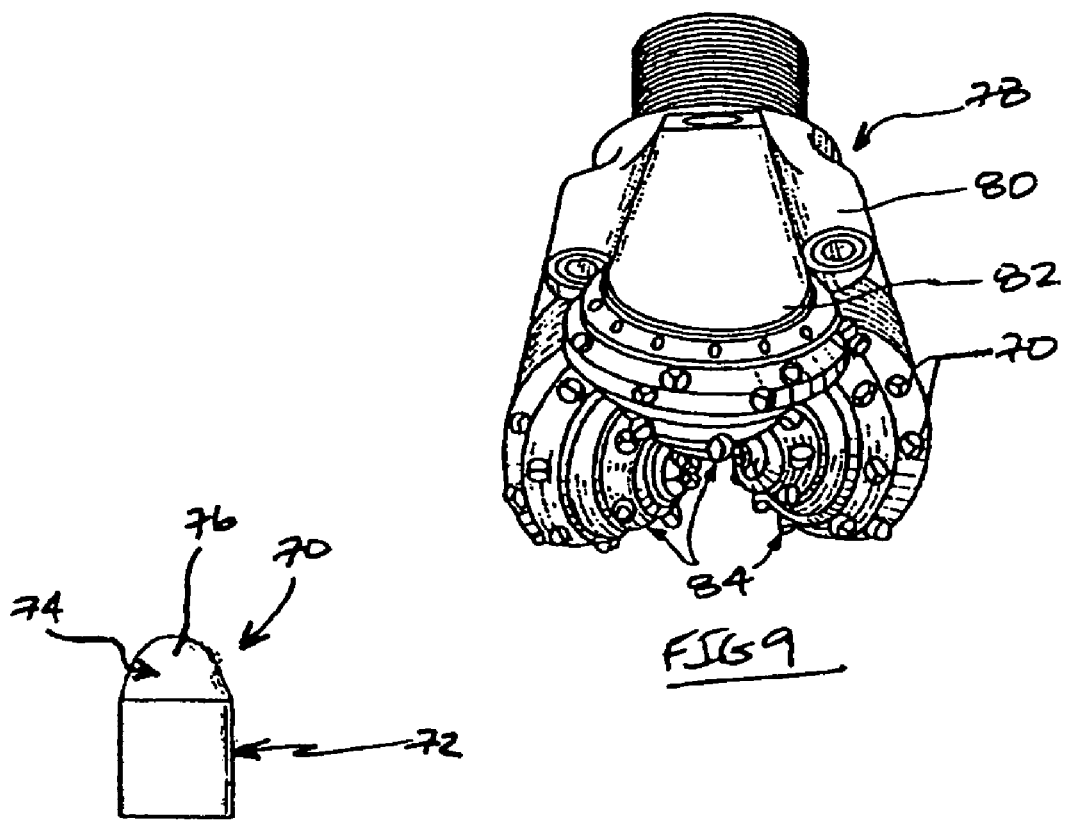
FIG.9
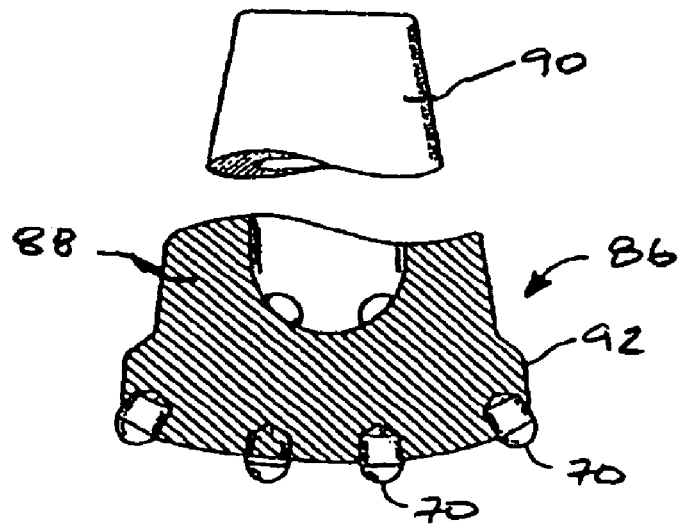
FIG.8
FIG.10

DIAMOND-BONDED BODIES AND COMPACTS WITH IMPROVED THERMAL STABILITY AND MECHANICAL STRENGTH

FIELD OF THE INVENTION

This invention generally relates to diamond-bonded materials and, more specifically, to polycrystalline diamond materials and compacts formed therefrom that are specially engineered to provide improved properties of thermal stability and mechanical strength when compared to conventional polycrystalline diamond materials.

BACKGROUND OF THE INVENTION

Polycrystalline diamond (PCD) materials and PCD elements formed therefrom are well known in the art. Conventional PCD is formed by combining diamond grains with a suitable solvent catalyst material to form a mixture. The mixture is subjected to processing conditions of extremely high pressure/high temperature, where the solvent catalyst material promotes desired intercrystalline diamond-to-diamond bonding between the grains, thereby forming a PCD structure. The resulting PCD structure produces enhanced properties of wear resistance and hardness, making PCD materials extremely useful in aggressive wear and cutting applications where high levels of wear resistance and hardness are desired.

Solvent catalyst materials that are typically used for forming conventional PCD include metals from Group VIII of the Periodic table, with cobalt (Co) being the most common. Conventional PCD can comprise from 85 to 95% by volume diamond and a remaining amount of the solvent catalyst material. The solvent catalyst material is present in the microstructure of the PCD material within interstices that exist between the bonded together diamond grains.

A problem known to exist with such conventional PCD materials is thermal degradation due to differential thermal expansion characteristics between the interstitial solvent catalyst material and the intercrystalline bonded diamond. Such differential thermal expansion is known to occur at temperatures of about 400° C., causing ruptures to occur in the diamond-to-diamond bonding, and resulting in the formation of cracks and chips in the PCD structure.

Another problem known to exist with conventional PCD materials is also related to the presence of the solvent catalyst material in the interstitial regions and the adherence of the solvent catalyst to the diamond crystals to cause another form of thermal degradation. Specifically, the solvent catalyst material is known to cause an undesired catalyzed phase transformation in diamond (converting it to carbon monoxide, carbon dioxide, or graphite) with increasing temperature, thereby limiting practical use of the PCD material to about 750° C.

Attempts at addressing such unwanted forms of thermal degradation in PCD are known in the art. Generally, these attempts have involved the formation of a PCD body having an improved degree of thermal stability when compared to the conventional PCD material discussed above. One known technique of producing a thermally stable PCD body involves at least a two-stage process of first forming a conventional sintered PCD body, by combining diamond grains and a cobalt solvent catalyst material and subjecting the same to high pressure/high temperature process, and then removing the solvent catalyst material therefrom.

This method, which is fairly time consuming, produces a resulting diamond-bonded body that is substantially free of the solvent catalyst material, and is therefore promoted as providing a diamond-bonded body having improved thermal stability when compared to conventional PCD. However, the resulting thermally stable diamond-bonded body typically does not include a metallic substrate attached thereto, by solvent catalyst infiltration from such substrate due to the solvent catalyst removal process, as all of the solvent catalyst material has been removed therefrom.

The resulting diamond-bonded body, rendered free of the solvent catalyst material, has a coefficient of thermal expansion that is sufficiently different from that of conventional substrate materials (such as WC—Co and the like) typically infiltrated or otherwise attached to conventional PCD bodies to provide a diamond-bonded compact to adopt the diamond-bonded body construction for use with desirable wear and/or cutting end use devices. This difference in thermal expansion between the now thermally stable diamond-bonded body and the substrate, combined with the poor wetability of the diamond-bonded body surface due to the removal of the solvent catalyst material, makes it very difficult to form an adequate attachment between the diamond-bonded body and conventionally used substrates, thereby requiring that the diamond-bonded body itself be attached or mounted directly to the wear and/or cutting device.

However, since such thermally stable diamond-bonded body is devoid of a metallic substrate, it cannot (e.g., when configured for use as a cutting element in a bit used for subterranean drilling) be attached to such drill bit by conventional brazing process. Thus, use of such thermally stable diamond-bonded body in this particular application necessitates that the diamond-bonded body itself be attached to the drill bit by mechanical or interference fit during manufacturing of the drill bit, which is labor intensive, time consuming, and which does not provide a most secure method of attachment.

Additionally, because such conventional thermally stable diamond-bonded body no longer includes the solvent catalyst material, which provide properties of toughness and fracture strength, it is known to be relatively brittle and have poor impact strength, thereby limiting its use to less extreme or severe applications. This feature makes such conventional thermally stable diamond-bonded bodies generally unsuited for use in aggressive cutting and/or wear applications, such as use as a cutting element of a subterranean drilling and the like.

It is, therefore, desired that a diamond-bonded material be developed that has improved thermal stability when compared to conventional PCD materials. It is also desired that such diamond-bonded material be engineered to include a suitable substrate to form a compact construction that can be attached to a desired wear and/or cutting device by conventional method such as welding or brazing and the like. It is further desired that such thermally stable diamond-bonded material have improved properties of strength and toughness when compared to the above-noted conventional thermally stable diamond-bonded bodies. It is further desired that such diamond-bonded material and compacts formed therefrom be manufactured at reasonable cost without requiring excessive manufacturing times and without the use of exotic materials or techniques.

SUMMARY OF THE INVENTION

Thermally stable diamond-bonded compacts include a diamond-bonded body comprising a thermally stable region that extends a distance below a diamond-bonded body surface. The thermally stable region has a material microstructure comprising a matrix first phase of bonded together diamond crystals, and a second phase interposed within the matrix first phase. The second phase comprises one or more reaction products formed between one or more infiltrant material and the diamond crystals at high pressure/high temperature conditions. In an example embodiment, the second phase occupies voids that previously existed within the material microstructure and that were formed by removing a catalyst material therefrom. The second phase may or may not occupy all of the voids in the thermally stable region.

The diamond-bonded body further includes a polycrystalline diamond region that extends a depth from the thermally stable region and has a material microstructure comprising a polycrystalline diamond matrix phase and a catalyst material disposed within interstitial regions of the matrix phase. The compact includes a substrate attached to the diamond-bonded body.

In an example embodiment, the thermally stable region is substantially free of the catalyst material. Further, the reaction product preferably has one or more thermal characteristics that more closely match that of the bonded together diamond crystals when compared to the catalyst material. Additionally, the infiltrant material preferably has a melting temperature below that of the catalyst material. In an example embodiment, the infiltrant material is silicon.

The thermally stable region of the diamond-bonded body is prepared by treating a partial region of a diamond-bonded body, formed from polycrystalline diamond comprising bonded together diamond crystals and a catalyst material disposed interstitially between the diamond crystals, to remove the catalyst material therefrom. The resulting diamond-bonded body comprises the thermally stable region and the polycrystalline diamond region. The thermally stable region comprises a plurality of voids disposed therein formed by the removal of the catalyst material.

The infiltrant or replacement material is added or combined with the diamond-bonded body and the diamond-bonded body and the infiltrant material are subjected to a high pressure/high temperature process to melt the infiltrant material. The infiltrant material fills at least a portion or population of the voids, and forms a reaction product with the diamond crystals that is bonded to the diamond crystals in the thermally stable region, thereby forming the second phase within the material microstructure. In an example embodiment, where the infiltrate or replacement material is silicon, the reaction product is silicon carbide.

BRIEF DESCRIPTION OF THE DRAWINGS

These and other features and advantages of the present invention will be appreciated as the same becomes better understood by reference to the following detailed description when considered in connection with the accompanying drawings wherein:

FIG. 8 is a perspective side view of an insert, for use in a roller cone or a hammer drill bit, comprising the thermally stable diamond-bonded compacts of this invention;

FIG. 9 is a perspective side view of a roller cone drill bit comprising a number of the inserts of FIG. 8;

FIG. 10 is a perspective side view of a percussion or hammer bit comprising a number of inserts of FIG. 8;

DETAILED DESCRIPTION

Figure 1:
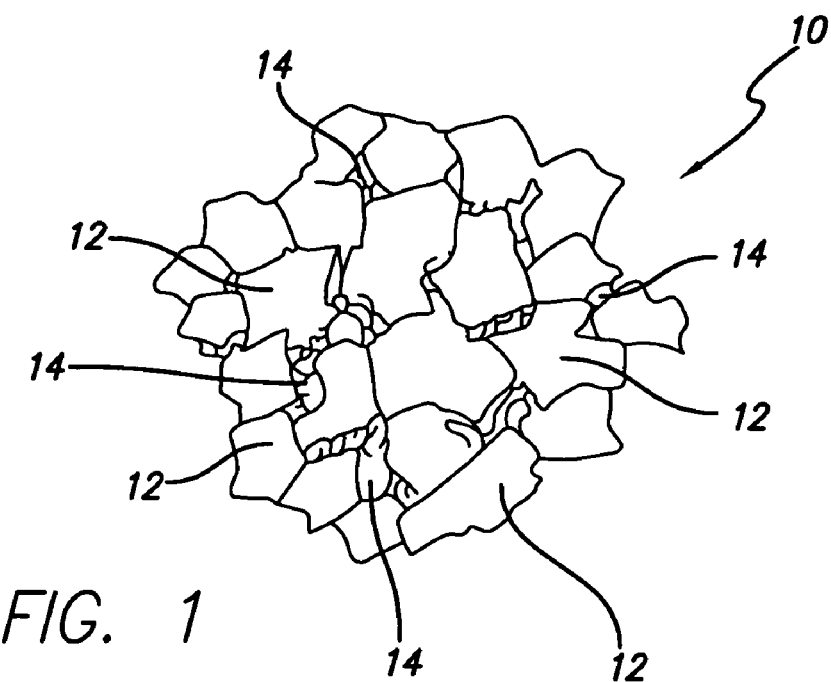
FIG. 1 is schematic microstructural view taken of a thermally stable region of a diamond-bonded material of this invention.

Thermally stable diamond-bonded materials and compacts of this invention are specifically engineered having a diamond-bonded body comprising a thermally stable diamond-bonded region, thereby providing improved thermal stability when compared to conventional PCD materials. The thermally stable diamond-bonded region comprises a polycrystalline matrix first phase and a second phase disposed interstitially between the bonded diamond crystals forming the matrix first phase. The second phase occupies all or a population of voids or pores in the microstructure that were formed by the removal of a solvent catalyst material. In an example embodiment, the second phase is formed from a material that is different from the metal solvent catalyst used to form conventional PCD.

As used herein, the term "PCD" is used to refer to polycrystalline diamond that has been formed, at high pressure/high temperature (HPHT) conditions, through the use of a metal solvent catalyst, such as those metals included in Group VIII of the Periodic table, that remains within the material microstructure. The thermally stable diamond-bonded region, present in diamond-bonded materials of this invention, is not referred to as being PCD because it does not include a catalyst material, e.g., a solvent catalyst, in its microstructure. Further, the thermally stable diamond-bonded region is unlike conventional thermally stable diamond-bonded material because it does not include the plurality of unfilled voids or pores resulting from the removal of the solvent catalyst therefrom.

The diamond-bonded body includes, in addition to the thermally stable diamond-bonded region, a region comprising conventional PCD. The presence of such PCD region in the diamond body operates to impart desired properties of hardness/toughness and impact strength to the diamond body that are otherwise lacking in conventional thermally stable diamond-bonded materials that have been rendered thermally stable by having substantially all of the solvent catalyst material removed therefrom. The presence of a PCD region in the diamond-bonded body also allows thermally stable diamond-bonded materials of this invention to be permanently joined to a substrate, thereby facilitating attachment of the resulting thermally stable diamond-bonded compact to a desired end use cutting and/or wear device, e.g., a bit used for drilling subterranean formations, by conventional means such as by brazing, welding and the like.

Thermally stable diamond-bonded materials and compacts of this invention are preferably made by treating a PCD compact to remove the catalyst material from a region thereof, and then filling the region removed of the catalyst material with a replacement material. When starting with a preformed PCD compact, the thermally stable diamond-bonded compacts of this invention can be formed using a single HPHT process, and when starting without a preformed PCD compact, thermally stable diamond-bonded compacts of this invention can be formed using two HPHT processes; namely, a first HPHT process to form the PCD compact, and a second HPHT process to form the thermally stable diamond-bonded material.

FIG. 1 illustrates a region of a thermally stable diamond-bonded material 10 of this invention having a material microstructure comprising the following material phases. A polycrystalline diamond matrix first phase 12 comprises a plurality of bonded together diamond crystals formed by the bonding together of adjacent diamond grains at HPHT conditions. A second material phase 14 is disposed interstitially between bonded together diamond crystals and comprises a replacement material and/or a reaction product of such replacement material with the diamond.

As described in greater detail below, the replacement material selected to form the second phase is preferably one that is not a catalyst material for the formation of the polycrystalline matrix first phase, i.e., one that does not facilitate formation of the polycrystalline matrix phase during HPHT process or during operation of the material at elevated temperatures. As used herein, the term "catalyst material" is understood to refer to those materials that facilitate the bonding together of diamond crystals and/or the changing of graphite to diamond or diamond to another carbon-based compound, e.g., graphite.

Additionally, it is desired that the replacement material be one that reacts with the polycrystalline matrix to form a reaction product therewith. The presence of such reaction product may be desired in certain applications calling for an enhanced degree of mechanical strength within the thermally stable diamond-bonded region, as such reaction product operates to enhance the structural strength of the thermally stable diamond-bonded region by filling what would be voids in conventional thermally stable materials.

Accordingly, the material microstructure of this thermally stable diamond-bonded region comprises a distribution of both intercrystalline bonded diamond 12, and may comprise diamond grains or crystals that are bonded together by reaction with the replacement material forming the second phase that fills all or a population of the plurality of voids or pores resulting from the removal of the catalyst material.

Diamond grains useful for forming the diamond-bonded body of this invention during the HPHT process include diamond powders having an average diameter grain size in the range of from submicrometer in size to 0.1 mm, and more preferably in the range of from about 0.005 mm to 0.08 mm. The diamond powder can contain grains having a mono or multi-modal size distribution. In a preferred embodiment for a particular application, the diamond powder has an average particle grain size of approximately 20 to 25 micrometers. However, it is to be understood that the diamond grains having a grain size less than this amount, e.g., less than about 15 micrometers, can be used for certain drilling and/or cutting applications. In the event that diamond powders are used having differently sized grains, the diamond grains are mixed together by conventional process, such as by ball or attrittor milling for as much time as necessary to ensure good uniform distribution.

The diamond powder used to prepare the diamond-bonded body can be synthetic diamond powder. Synthetic diamond powder is known to include small amounts of solvent metal catalyst material and other materials entrained within the diamond crystals themselves. Alternatively, the diamond powder used to prepare the diamond-bonded body can be natural diamond powder. The diamond grain powder, whether synthetic or natural, can be combined with a desired amount of solvent catalyst to facilitate desired intercrystalline diamond bonding during HPHT processing.

Suitable solvent catalysts useful for forming the PCD body include metals selected from the Group VIII of the Periodic table, with cobalt (Co) being the most common, and mixtures or alloys of two or more of these materials. The diamond grain powder and catalyst material mixture can comprise 85 to 95% by volume diamond grain powder and the remaining amount catalyst material. In certain applications, the mixture can comprise greater than 95% by volume diamond grain powder. Alternatively, the diamond grain powder can be used without adding a solvent metal catalyst in applications where the solvent metal catalyst is provided by infiltration during HPHT processing from a substrate positioned adjacent the diamond powder volume.

In certain applications it may be desired to have a diamond-bonded body comprising a single diamond-containing volume or region, while in other applications it may be desired that a diamond-bonded body be constructed having two or more different diamond-containing volumes or regions. For example, it may be desired that the diamond-bonded body include a first diamond-containing region extending a distance from a working surface, and a second diamond-containing region extending from the first diamond-containing region to the substrate. Such diamond-containing regions can be engineered having different diamond volume contents and/or be engineered having differently sized diamond grains. It is, therefore, understood that thermally stable diamond-bonded constructions of this invention may include one or multiple regions comprising different diamond densities and/or diamond grain sizes as called for by a particular cutting and/or wear end use application.

In an example embodiment, the diamond grain powder is preferably cleaned, and loaded into a desired container adjacent a desired substrate for placement within a suitable HPHT consolidation and sintering device. An advantage of combining a substrate with the diamond powder volume prior to HPHT processing is that the resulting compact includes the substrate bonded thereto to facilitate eventual attachment of compact to a desired wear and/or cutting device by conventional method, e.g., by brazing or welding. In an example embodiment, the substrate includes a metal solvent catalyst for catalyzing intercrystalline bonding of the diamond grains by infiltration during the HPHT process.

Suitable materials useful as substrates include those materials used as substrates for conventional PCD compacts, such as those formed from ceramic materials, metallic materials, cermet materials, carbides, nitrides, and mixtures thereof. In a preferred embodiment, the substrate is provided in a preformed state and includes a metal solvent catalyst capable of infiltrating into the adjacent diamond powder mixture during HPHT processing to facilitate sintering and providing a bonded attachment with the resulting sintered body. It is desired that the metal solvent catalyst disposed within the substrate be one that melts at a temperature above the melting temperature of the replacement material and the reaction temperature of the matrix material with the replacement material. Suitable metal solvent catalyst materials include those selected from Group VIII elements of the Periodic table. A preferred metal solvent catalyst is cobalt (Co), and a preferred substrate material comprises cemented tungsten carbide (WC—Co).

The HPHT device is activated to subject the container and its contents to a desired HPHT condition to consolidate and sinter the diamond powder mixture to form PCD. In an example embodiment, the device is controlled so that the container is subjected to a HPHT condition comprising a pressure in the range of from 5 to 7 GPa and a temperature in the range of from about 1,320 to 1,600° C., for a sufficient period of time. During this HPHT process, the catalyst material present in the substrate melts and infiltrates into the diamond grain powder to facilitate intercrystalline diamond bonding and bonding of the resulting diamond-bonded body to the substrate. During formation of the diamond-bonded body, the catalyst material migrates into interstitial regions within the diamond-bonded body disposed between the diamond-bonded grains.

Figure 2A:
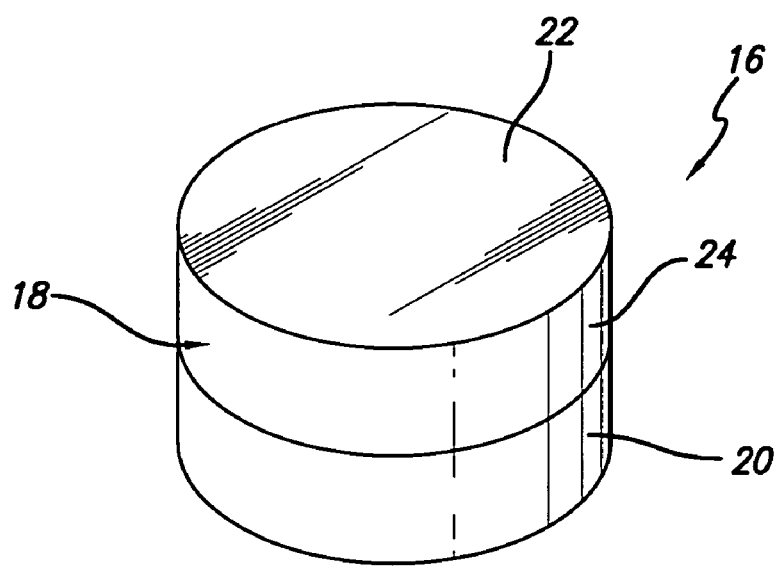
FIGS. 2A to 2E are perspective views of different PCD compacts useful for forming thermally stable diamond-bonded compacts of this invention.
Figure 2B:
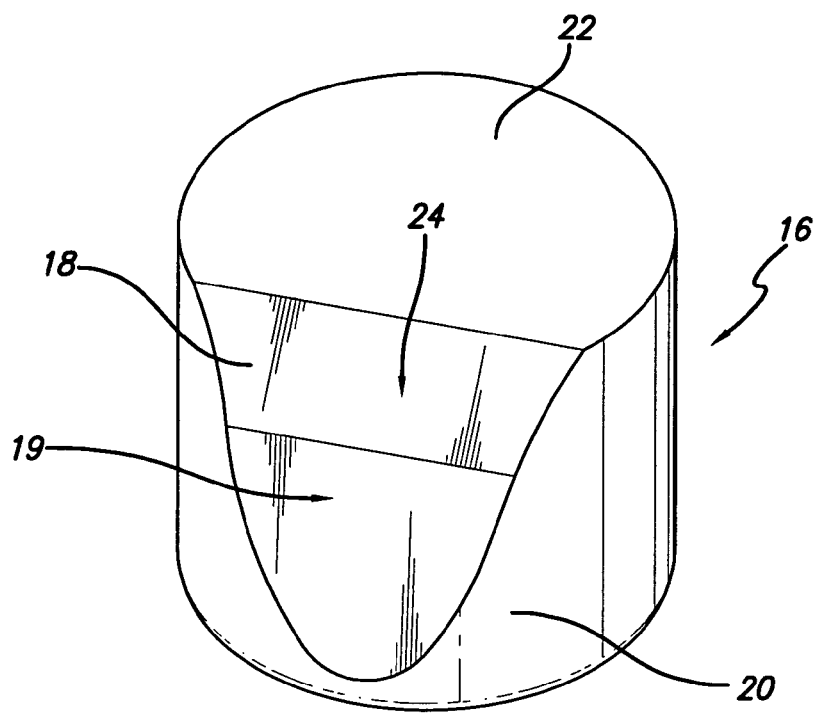
Figure 2C:
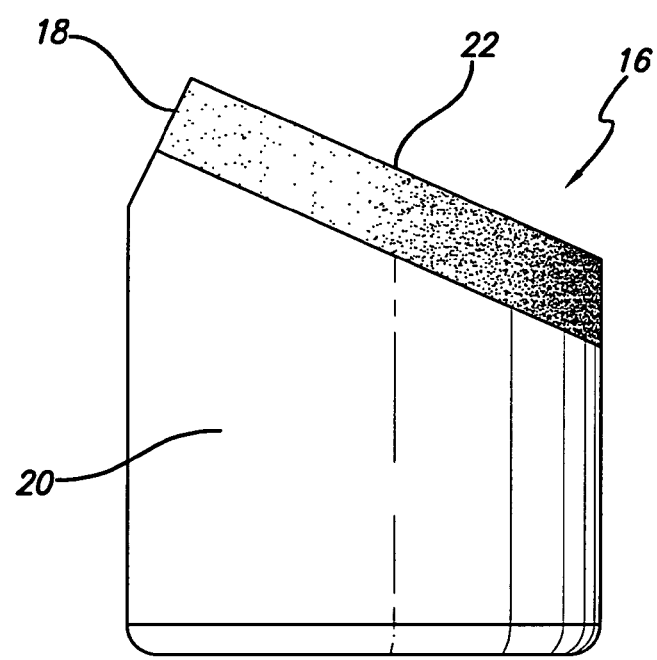
Figure 2D:
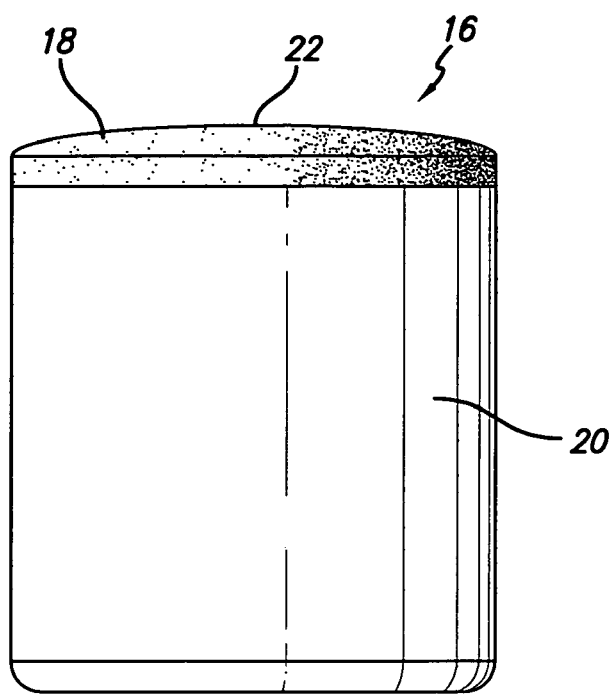
Figure 2E:
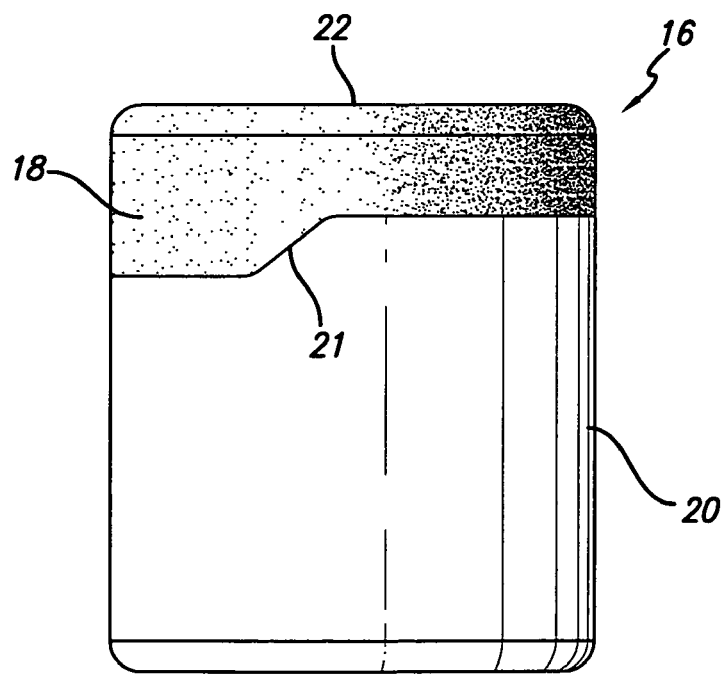

FIG. 2A illustrates a PCD compact 16 formed according to this process comprising a diamond-bonded body 18 formed from PCD and a substrate 20 attached thereto. The diamond body includes a working surface 22 positioned along a desired outside surface portion of the diamond body 18. In the example embodiment illustrated in FIG. 2A, the diamond body and substrate are each configured in the form of generally cylindrical members, and the working surface is positioned along an axial end across a diamond table of the diamond body 18.

It is to be understood, the PCD compacts useful for forming thermally stable diamond-bonded compacts of this invention can be configured differently, e.g., having a diamond body mounted differently on the substrate and/or having the working surface positioned differently along the diamond body and/or differently relative to the substrate. FIGS. 2B to 2E illustrate PCD compact embodiments that are configured differently than that illustrated in FIG. 2A for purposes of reference, and that are all useful for forming thermally stable diamond-bonded compacts of this invention.

Once formed, the diamond-bonded body 18 is treated to remove the catalyst material from a selected region thereof. This can be done, for example, by removing substantially all of the catalyst material from the selected region by suitable process, e.g., by acid leaching, aqua regia bath, electrolytic process, chemical processes, electrochemical processes or combinations thereof.

It is desired that the selected region where the catalyst material is removed, or the region of the diamond-bonded body that is substantially free of the catalyst material, be one that extends a determined depth from a surface, e.g., a working or cutting surface, of the diamond-bonded body independent of the working or cutting surface orientation. Again, it is to be understood that the working or cutting surface may include more than one surface portion of the diamond-bonded body. In an example embodiment, it is desired that the region rendered substantially free of the catalyst material extend from a working or cutting surface of the diamond-bonded body an average depth of at least about 0.08 mm. The exact depth of this region is understood to vary depending on such factors as the diamond density, the diamond grain size, and the ultimate end use application.

In an example embodiment, the region can extend from the working surface to an average depth of less than about 0.1 mm, preferably extend from a working or cutting surface an average depth of from about 0.02 mm to an average depth of less than about 0.09 mm, and more preferably extend from a working or cutting surface an average depth of from about 0.04 mm to an average depth of about 0.08 mm. In another example embodiment, e.g., for more aggressive tooling, cutting and/or wear applications, the region rendered substantially free of the catalyst material can extend a depth from the working surface of greater than about 0.1 mm.

The diamond-bonded body can be machined to its approximate final dimension prior to treatment. Alternatively, the diamond-PCD compact can be treated first and then machined to its final dimension. The targeted region for removing the catalyst material can include any surface region of the body, including, and not limited to, the diamond table, a beveled section extending around and defining a circumferential edge of the diamond table, and/or a sidewall portion extending axially a distance away from the diamond table towards or to the substrate interface.

It is to be understood that the depth of the region removed of the catalyst material is represented as being a nominal, average value arrived at by taking a number of measurements at preselected intervals along this region and then determining the average value for all of the points. The remaining/untreated region of the diamond-body is understood to still contain the catalyst material and comprises PCD.

Additionally, when the diamond-bonded body is treated, it is desired that the selected depth of the region to be rendered substantially free of the catalyst material be one that allows a sufficient depth of remaining PCD so as to not adversely impact the attachment or bond formed between the diamond-bonded body and the substrate. In an example embodiment, it is desired that the untreated or remaining PCD region within the diamond-bonded body have a thickness of at least about 0.01 mm as measured from the substrate. It is, however, understood that the exact thickness of the PCD region can and will vary from this amount depending on such factors as the size and configuration of the compact, and the particular PCD compact application.

In an example embodiment, the selected region of the diamond-bonded body to be removed of the catalyst material is treated by exposing the desired surface or surfaces of the diamond-bonded body to acid leaching, as disclosed for example in U.S. Pat. No. 4,224,380, which is incorporated herein by reference. Generally, after the diamond-bonded body or compact is made by HPHT process, the identified body surface or surfaces, e.g., the working and/or cutting surfaces, are placed into contact with the acid leaching agent for a sufficient period of time to produce the desired leaching or catalyst material depletion depth.

Suitable leaching agents for treating the selected region include materials selected from the group consisting of inorganic acids, organic acids, mixtures and derivatives thereof. The particular leaching agent that is selected can depend on such factors as the type of catalyst material used, and the type of other non-diamond metallic materials that may be present in the diamond-bonded body In an example embodiment, suitable leaching agents include hydrofluoric acid (HF), hydrochloric acid (HCl), nitric acid ($HNO_3$), and mixtures thereof.

In an example embodiment, where the diamond body to be treated is in the form of a diamond-bonded compact, the compact is prepared for treatment by protecting the substrate surface and other portions of the diamond-bonded body adjacent the desired treated region from contact (liquid or vapor) with the leaching agent. Methods of protecting the substrate surface include covering, coating or encapsulating the substrate and portion of PCD body with a suitable barrier member or material such as wax, plastic or the like.

Figure 3:
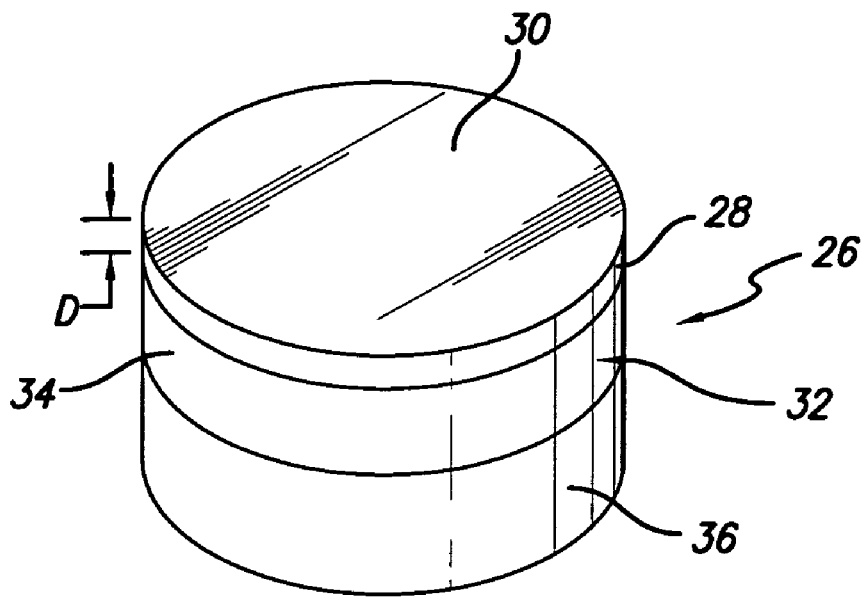
FIG. 3 is a perspective view of a PCD compact that has been treated to remove the catalyst material therefrom in preparation for forming thermally stable diamond-bonded compacts of this invention.
Figure 4:
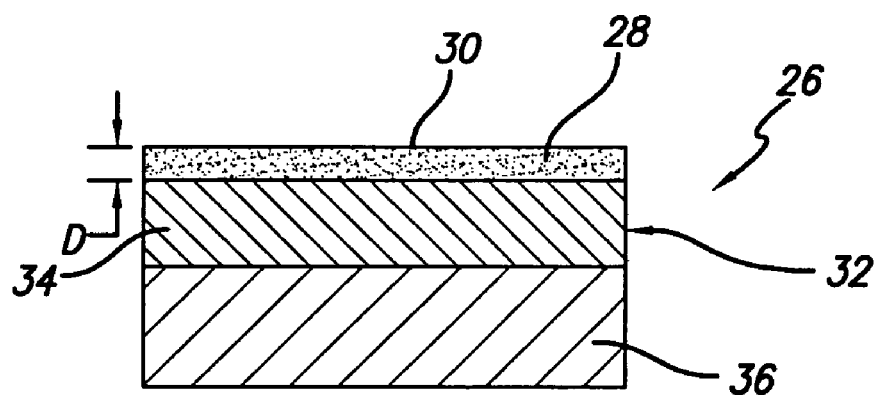
FIG. 4 is a cross-sectional side view of the PCD compact of FIG. 3.

FIGS. 3 and 4 illustrate example embodiments of the thermally stable diamond-bonded compacts of this 26 of this invention after a selected region has been targeted and treated to remove the catalyst material from a selected region. The compact 26 comprises a treated region 28 that extends a selected depth "D" from a working or cutting surface 30 of the diamond-bonded body 32. The remaining region 34 of the diamond-bonded body 32, extending from the treated region 28 to the substrate 36, comprises PCD having the catalyst material intact. As discussed above, the exact depth of the treated region having the catalyst material removed therefrom can and will vary.

Additionally, as mentioned briefly above, it is to be understood that the thermally stable diamond-bonded compacts described above and illustrated in FIGS. 3 and 4 are representative of a single embodiment of this invention for purposes of reference, and that thermally stable diamond-bonded compacts constructed other than that specifically described and illustrated are understood to be within the scope of this invention. For example, thermally stable diamond-bonded compacts comprising a diamond body having a treated region and then two or more other regions are possible, wherein a region interposed between the treated region and the region adjacent the substrate may be a transition region having a different diamond density and/or formed from diamond grains sized differently from that of the other diamond-containing regions.

Figure 5:
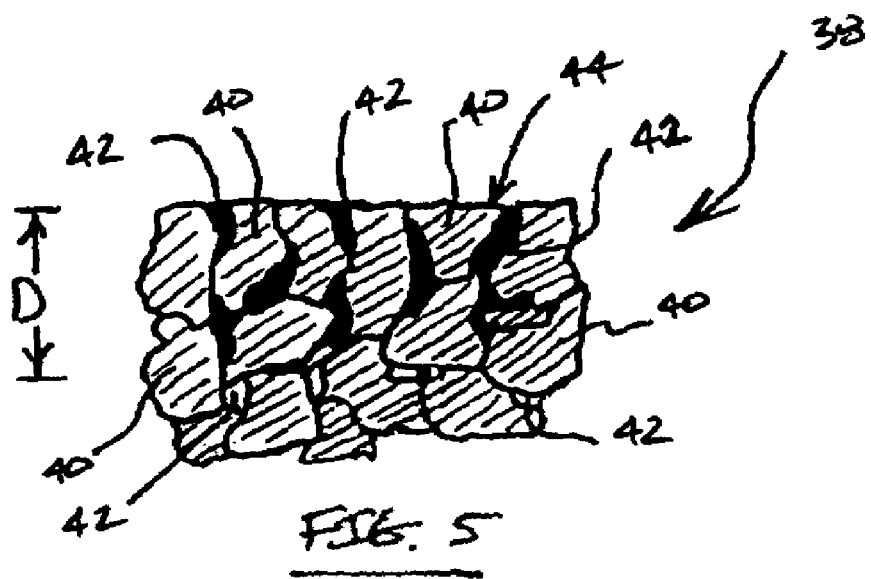
FIG. 5 is a schematic microstructural view taken from the treated region of the PCD compact of FIGS. 3 and 4.

FIG. 5 illustrates the material microstructure 38 of the thermally stable diamond-bonded compact of this invention and, more specifically, a section of the treated region of the compact. The treated region comprises a matrix phase of intercrystalline bonded diamond formed from a plurality of bonded together diamond grains 40. The treated region also includes a plurality of interstitial regions 42 interposed between the diamond grains or crystals that are now substantially free of the catalyst material. The treated region is shown to extend a distance "D" from a working or cutting surface 44 of the diamond-boded body.

In one example embodiment, once the catalyst material is removed from the targeted region, the resulting diamond-bonded body is loaded into a container for placement within the HPHT device for HPHT processing. Before being placed into the container, a desired replacement material is positioned adjacent a surface of the treated area to facilitate infiltration into the treated region during the HPHT process. The replacement material is preferably selected from the group of materials having a melting temperature below that of the solvent metal catalyst within the PCD region of the diamond body. Additionally, it is desired that the replacement material be one that will not act as a catalyst to facilitate diamond-to-diamond bonding during the HPHT process, and not act as a catalyst to convert the diamond in the polycrystalline matrix phase into another carbon-containing compound, e.g., graphite, during application of the thermally stable diamond-bonded compact in a tooling, cutting, and/or wear application. Replacement materials may also be selected from the group of materials that react with the diamond to form a reaction product therewith.

A suitable replacement material is silicon (Si), as it has a melting temperature that is below that of the metal solvent catalyst in the PCD region of the diamond-bonded body (at elevated temperatures and pressures), it does not act as a catalyst material to diamond during the HPHT process or during operation of the so-formed thermally stable diamond-bonded compact in such cutting and/or wear applications as when used as a cutting element on a subterranean drill bit, and it is known to react with diamond during the HPHT process to form a reaction product therewith (silicon carbide-SiC).

Other suitable replacement materials include those formed from metals, refractory metals, ceramic materials, and combinations thereof that meet the above noted qualifications. Examples of such materials include alloys of various metals that have a sufficiently low melting point and meet the criteria described above. Such materials include brazing alloys, reactive brazes and metal-matrix compounds. These materials may typically include one or more of the following elements: Si, Cu, Sn, Zn, Ag, Au, Ti, Cd, Al, Mg, Ga, Ge, which may also be used in compounds containing conventional solvent-catalyst materials (transition metals) where the solvent catalyst is rendered inactive by reaction with another material.

During the HPHT process, the replacement material melts and infiltrates into the adjacent surface of the treated region of the diamond-bonded body. In the case where the replacement material is silicon, it then reacts with the diamond crystals within the polycrystalline matrix phase to form SiC between the diamond crystals in the adjacent region of the microstructure, thereby forming the second phase within the material microstructure. In such example embodiment, where silicon is provided as the selected replacement material, it is desired that the HPHT process be conducted at a temperature sufficient to melt the silicon, at a pressure high enough to keep the diamond thermodynamically stable, (this may be lower than that used in the formation of the body due to the fact that this operation is carried out at lower temperatures than the forming process), and for a period of time of from about 2 to 20 minutes. This time period must be sufficient to melt all of the silicon, allow the melted silicon to infiltrate the treated region of the diamond-bonded body, and allow the infiltrated silicon to react with the diamond crystals in this region to form the desired SiC, thereby operating to form a further bond with the diamond crystals. In an example embodiment, it is desired that substantially all of the silicon infiltrant be reacted.

While particular HPHT pressures, temperatures and times have been provided, it is to be understood that one or more of these process variables may change depending on such factors as the type and amount of replacement material, and/or the type of diamond-bonded body. A key point, however, is that the HPHT process for infiltrating the replacement material be below the melting temperature of the solvent metal catalyst in the PCD region of the diamond-bonded body, to permit the enable the replacement material to infiltrate and react with the diamond-bonded crystals without the solvent metal catalyst in the PCD region infiltrating into the treated region.

The silicon replacement material can be provided in the form of a silicon metal foil or powder that is positioned adjacent a surface of the treated region of the diamond-bonded body, thereby infiltrating during the HPHT process into the treated region to fill the voids and pores disposed therein formed by the removal of the catalyst material.

Other methods of applying or providing the replacement material may be by coating or partially infiltrating the surface and voids in the treated region prior to placement in the HPHT device by processes such as Chemical Vapor Deposition (CVD) or Physical Vapor Deposition (PVD). Other methods such as wet chemical plating or electro-deposition or filling the voids with a precursor material such an organic-metal complex and reacting this material to form a metal may also be employed. Such methods of applying the replacement material to the diamond-bonded body, i.e., to the treated region, can be used as an alternative or in addition to providing the replacement material during the HPHT process.

When the replacement material is provided in the form of a coating prior to placement in the HPHT device, the replacement material can achieve a desired degree of penetration into the treated material to fill the empty voids within the treated region. The exact depth of penetration can and will vary on a number of factors such as the type of coating technique used, the replacement material, and the type of material used to form the diamond-bonded body. An advantage of using such a coating technique to introduce the replacement material in the diamond-bonded body is that it would result in a smaller volume change during HPHT processing, which would also provide a more predictable and controlled HPHT process and resulting product.

A further advantage of introducing some or all of the replacement material in this manner is that it would reduce the amount of entrained gas in the product formed during the HPHT process, which would also help achieve a compact having a higher material density and possibly having better heat transfer properties, i.e., resulting from reducing the total volume of void space within the construction and thereby reducing the amount of heat transfer by convection and increasing the amount of heat transfer by conduction, which can operate to increase the overall heat transfer capability of the resulting body. Reducing the amount of entrained gas within the compact is also desired during the HPHT process as such gas operates to potentially reduce the extent of desired chemical reactions between the replacement material and the polycrystalline phase material.

Once the replacement material is applied in this manner, the coated diamond-bonded body is subjected to the HPHT process as described above to achieve any further desired extent of infiltration in addition to producing the reaction product between the replacement material and the polycrystalline matrix phase material.

In an example embodiment, the replacement material infiltrates into the entire diamond-boned body treated region, thereby providing a thermally stable diamond-bonded region extending a desired depth from the working surface. In certain situations, however, it may be difficult for the replacement material to infiltrate and fill the entire treated region, in which case a portion of the treated region may not be filled with the replacement material and such portion may still include some population of unfilled voids or pores. Alternatively, it may be intentionally desired that some population of the voids in the treated region remain unfilled with the replacement material. This may be desired, for example, for the purpose of providing a thermally and/or electrically insulating layer within the diamond body. Accordingly, it is to be understood that the diamond body treated region may be completely or only partially filled with the replacement material. In a preferred embodiment, all or a substantial portion of the treated region is filled with the replacement material, thus all or a substantial population of the voids or empty pores existing in this region are filled with the replacement material.

As noted above, when the replacement material used for infiltrating the filling the voids in the treated region of the diamond-bonded body is silicon, the infiltrated silicon forms a reaction phase with the diamond crystals in the diamond-bonded phase according to the reaction:

This reaction between silicon and carbon present in the diamond crystals is desired as the reaction product; namely, silicon carbide is a ceramic material having a coefficient of thermal expansion that is similar to diamond. At the interface within the diamond-bonded body between the thermally stable region and the PCD region, where both cobalt and silicon carbide may be present, reactions such as the following may take place: $Co+2SiC=CoSi_2+2C$. This, however, is not a concern and may be advantageous as $CoSi_2$ is also known to be a thermally stable compound.

Additionally, if the Co and SiC do not end up reacting together at the boundary or interface between the two regions, the presence of the silicon carbide adjacent the PCD region operates to minimize or dilute the otherwise large difference in the coefficient of thermal expansion that would otherwise exist between the intercrystalline diamond and the cobalt phases in PCD region. Thus, the formation of silicon carbide within the treated region of the diamond-bonded body operates to minimize the development of thermal stress in that region and at the interface between the treated and untreated diamond-bonded body regions, thereby improving the overall thermal stability of the entire diamond-bonded body.

As noted above, infiltration of the replacement material into the treated region of the diamond-bonded body operates to provide a thermally stable diamond-bonded region through the formation of a reaction product that actually forms a bond with diamond crystals. While a certain amount of diamond-to-diamond bonding may occur within this thermally stable diamond-bonded region during the HPHT process without the benefit of the replacement material due to the effects of minor amounts of residual catalyst and/or the effects of pressure and temperature driven plasticity and solid state diffusion, such additional direct diamond-to-diamond bonding represents a minority of the bonding that occurs in this region. In an example embodiment, where the replacement material is silicon, it is believed that greater than about 75 percent, and more preferably 85 percent or more, of the bonding occurring in the infiltrated treated diamond-bonded region is provided by reaction of the diamond crystals with the silicon.

While ideally, it is desired that substantially all of the bonding in the treated diamond-bonded region be provided by reaction with the infiltrated replacement material, any amount of diamond-to-diamond bonding occurring in this region without the presence or use of a metal solvent catalyst produces a region having a degree of thermal stability that is superior to conventional PCD.

It is to be understood that the amount of the replacement material used during HPHT processing can and will vary depending on such factors as the size and volume content of the diamond crystals in the treated region, the volume of the treated diamond-bonded region to be infiltrated, the amount and/or type of replacement material that is used, in addition to the particular end use application for the resulting thermally stable diamond-bonded compact. Additionally, the amount of the replacement material used to infiltrate the treated region must be precisely determined for the purpose of infiltrating and reacting with a desired volume of the diamond crystals to provide a desired thermally stable diamond-bonded region and so as not to have unreacted metal left over after the process which can be undesirable.

For example, using an excessive amount of the replacement material, e.g., silicon, to infiltrate and react with the diamond crystals can result in a stoichiometric excess of replacement material that remains unreacted. In the event that the replacement material is silicon, the presence of such unreacted silicon may form an undesired relatively brittle silicon phase. Alternatively, the unreacted silicon can react with the metal solvent catalyst material in the PCD region to form cobalt disilicide ($CoSi_2$) at the boundary between the two regions.

In addition to silicon, other materials useful for forming the replacement material include those that are capable of melting or reacting with diamond in the solid state during processing of the diamond-bonded materials at a temperature that is below the melting temperature of the metal solvent catalyst component in the metallic substrate. Additionally, such replacement materials would include those that, upon reacting with the diamond, form a compound having a coefficient of thermal expansion that is relatively closer to that of diamond than that of the catalyst material that was removed from the treated diamond-bonded region. Additionally, it is also desired that the compound formed by reaction with diamond not only be capable of forming a strong bond with the diamond, but must also have significantly high-strength characteristics.

In an example embodiment, the source of silicon that is used as the replacement material for infiltration is provided in the form of a silicon metal disk. As noted above, the amount of silicon that is used can influence the depth of infiltration as well as the resulting types of silicon compounds that can be formed. In an example embodiment, where the volume of the diamond-bonded body to become thermally stable is within the range of from about 50 to 400 cubic mm, it is desired that the required amount of silicon infiltrant be in the range of from about 0.5 to 20 milligrams. In a preferred embodiment, where the desired silicon infiltration volume is approximately 100 cubic mm, the amount of silicon infiltrant to be used is approximately 2.2 milligrams. Because of the very small material quantities involved here, it may be advantageous to provide the infiltrant in some form mixed with an inert filler material so that it is more readily handled and evenly dispersed.

Although formation of a thermally stable region has been described through the use of a single replacement material for forming the second phase, it is to be understood that the thermally stable region can formed by using two or more replacement materials. For example, a first replacement material can be used to occupy some population of the voids disposed within the treated diamond-bonded body, and a second replacement material can be used to occupy some other population of the voids. In such example embodiment, the first replacement material can be used to fill the voids in one particular region, e.g., a region nearest the diamond-body surface, while the second replacement material can be used to fill the voids in another particular region, e.g., a region adjacent the PCD region. In addition to using two or more replacement materials to form different volumes within the thermally stable region, the replacement materials can be combined so that they occupy the same volume within the thermally stable region.

As noted above, in an example embodiment, the replacement materials that are selected react with the polycrystalline matrix phase to form a reaction product therewith, which reaction product can be different. The reaction product resulting from the use of the different replacement material can be positioned in the same or in different portions of the thermally stable region.

It is to be understood that the particular replacement materials that are used in each such embodiments can be tailored to provide the desired thermal and/or mechanical properties for each such portion of the thermally stable region, thus providing a further ability to customize the performance properties of the thermally stable region in the diamond-bonded body to meet the specific demands of a particular end use application.

Figure 6:
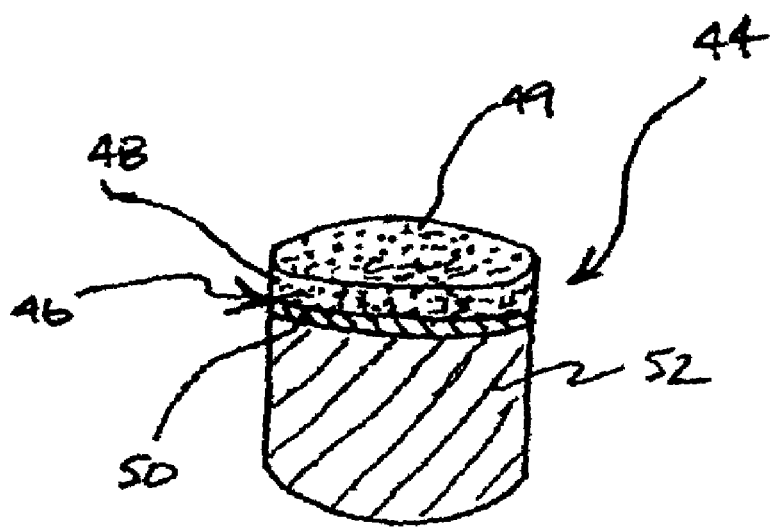
FIG. 6 is a perspective view of a thermally stable diamond-bonded compact of this invention.

FIG. 6 illustrates a schematic diagram of a thermally stable diamond-bonded compact 44 constructed according to principles described above. Generally speaking, such compact 44 comprises a diamond-bonded body 46 having the thermally stable diamond-bonded region 48 extending a depth from a diamond-bonded body working surface 49, and a conventional PCD region 50 extending from the thermally stable diamond-bonded region. The compact additionally includes a substrate 52 attached to the diamond-bonded body. In an example embodiment, the substrate is attached to the diamond-bonded body via the PCD region 50. While the thermally stable diamond-bonded compact 44 is illustrated having a generally cylindrical wall surface with a working surface positioned along an axial end of the compact, it is to be understood that thermally stable diamond-bonded compacts of this invention can be configured having a variety of different shapes and sizes depending on the particular wear and/or cutting application, e.g., based on the different PCD compact constructions illustrated in FIGS. 2B to 2E.

Figure 7A:
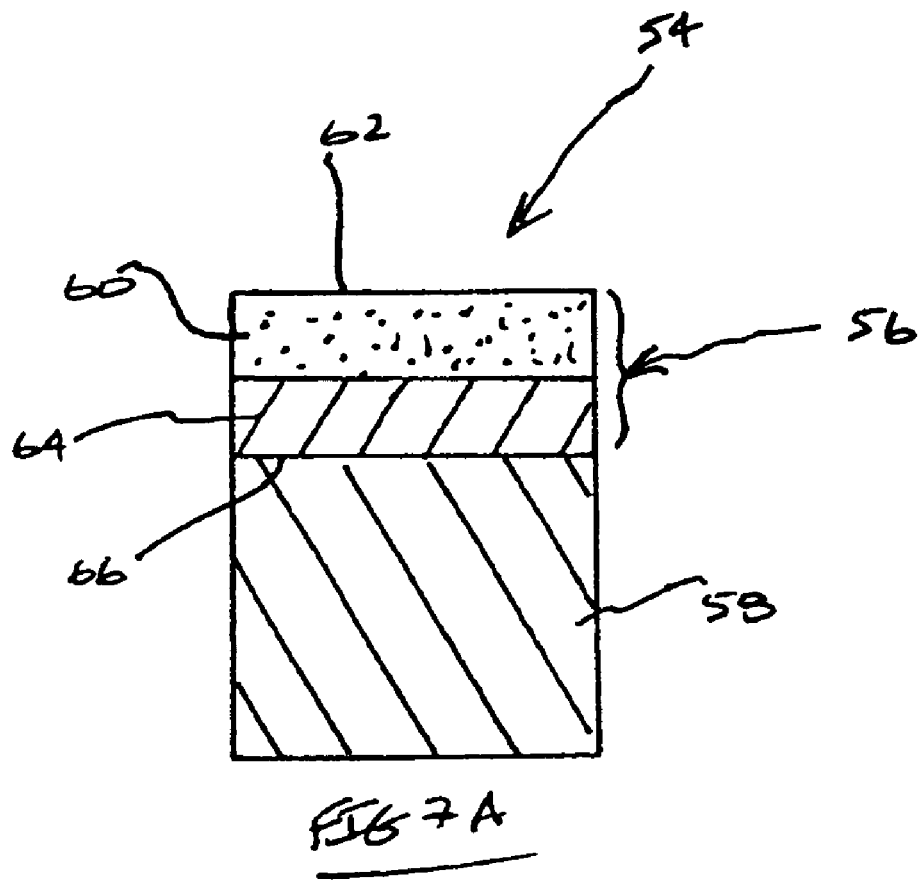
FIGS. 7A and 7B are cross-sectional side views of different thermally stable diamond-bonded compacts of this invention.
Figure 7B:
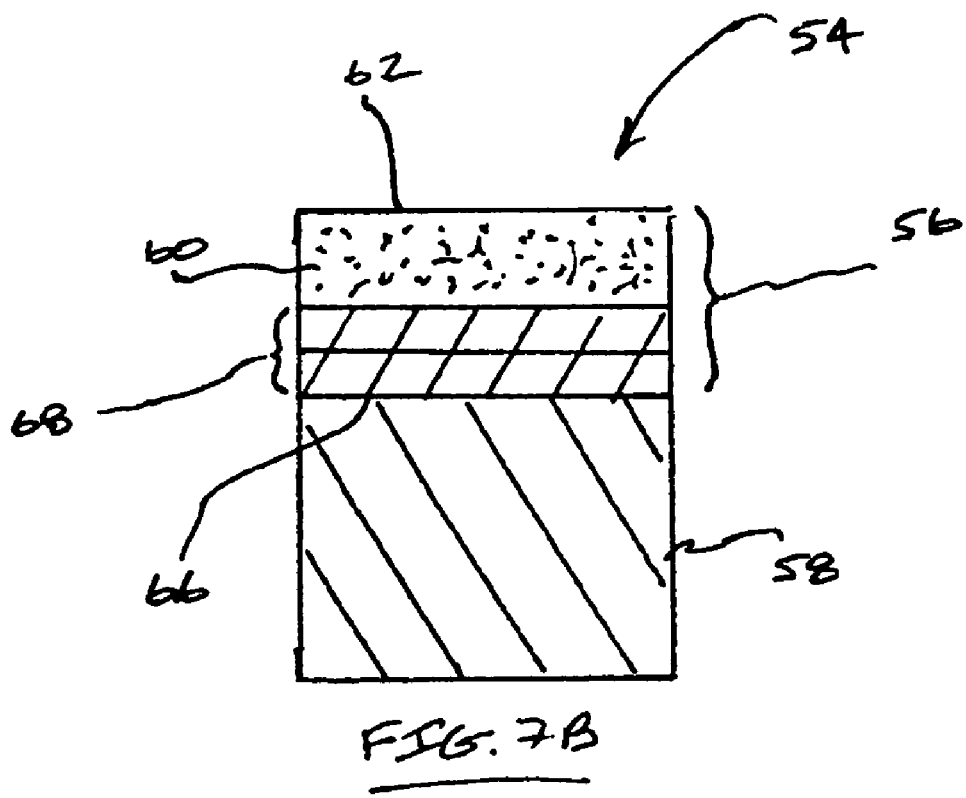

FIGS. 7A and 7B illustrate a cross-sectional side view of thermally stable diamond-bonded compacts 54 of this invention, each comprising a diamond-bonded body 56 that is attached to a substrate 58. The diamond-bonded body 56 comprises a thermally stable diamond-bonded region 60, extending a depth from a surface 62 of the diamond-bonded body. The thermally stable diamond-bonded region 60 has a material microstructure comprising a polycrystalline diamond matrix first phase of bonded together diamond crystals, and a second phase of the replacement material and/or its reaction product with the diamond crystals disposed interstitially within the matrix phase, as best illustrated in FIG. 1. Because the second phase is disposed within the interstitial regions of the material microstructure, that previously existed as voids, the second phase may also be referred to herein as a plurality of second phases as such are dispersed throughout the matrix phase. As noted above, this region 60 has an improved degree of thermal stability when compared to conventional PCD, due both to the absence of any conventional metal solvent catalyst and to the presence of the reaction product between the diamond and the preselected replacement material, as this reaction product has a coefficient of thermal expansion that more closely matches diamond as contrasted to a metal solvent catalyst such as cobalt.

The diamond-bonded body 56 includes another region 64, a conventional PCD region, that extends a depth from the thermally stable diamond-bonded region 60 through the body 56 to an interface 66 between the diamond-bonded body and the substrate. As noted above, in an example embodiment, the PCD region 64 is formed by solvent metal infiltration into the diamond grain powder from the substrate 58 during the HPHT process. As noted above, such metal solvent catalyst infiltration operates to ensure a desired attachment between the diamond-bonded body and the substrate, thereby ensuring use and attachment of the resulting thermally stable diamond-bonded compact to a desired end use application device by conventional means like brazing.

FIG. 7B illustrates another embodiment thermally stable diamond-bonded compact 54 prepared according to this invention, wherein instead of being formed from a single layer of green-state diamond grain material it is prepared using more than one layer, in this case two layers 68. During the HPHT processing, the two or more green-state diamond grain material layers 68 are bonded together, e.g., by solvent metal infiltration, adjacent diamond-to-diamond bonding, and the like. If desired, the diamond density, and/or diamond grain size, and/or use of solvent catalyst in the two green-state layers used to form this embodiment can vary depending on the particular desired performance characteristics. In an example embodiment, both layers 68 form PCD regions of the diamond-bonded body, and have different diamond volume contents, e.g., the diamond volume content nearest the thermally stable diamond-bonded region is greater than that nearest the substrate. Alternatively or additionally, each layer may be formed from differently sized diamond grains.

The above described thermally stable diamond-bonded materials and compacts formed therefrom will be better understood with reference to the following example:

EXAMPLE

Thermally Stable Diamond-Bonded Compact

Synthetic diamond powder having an average grain size of approximately 2-50 micrometers was mixed together for a period of approximately 2-6 hours by ball milling. The resulting mixture was cleaned by heating to a temperature in excess of 850° C. under vacuum. The mixture was loaded into a refractory metal container. A WC—Co substrate was positioned adjacent a surface of the diamond powder volume. The container was surrounded by pressed salt (NaCl) and this arrangement was placed within a graphite heating element. This graphite heating element containing the pressed salt and the diamond powder and substrate encapsulated in the refractory container was then loaded in a vessel made of a high temperature/high pressure self-sealing powdered ceramic material formed by cold pressing into a suitable shape.

The self-sealing powdered ceramic vessel was placed in a hydraulic press having one or more rams that press anvils into a central cavity. The press was operated to impose an intermediate stage processing pressure and temperature condition of approximately 5,500MPa and approximately 1,450° C. on the vessel for a period of approximately 20 minutes. During HPHT process, cobalt from the WC—Co substrate infiltrated into an adjacent region of the diamond powder mixture, and intercrystalline bonding between the diamond crystals took place forming PCD.

The vessel was opened and the resulting PCD compact was removed therefrom. A region of the diamond-bonded PCD body, extending a depth from a working surface was treated by acid leaching to remove the catalyst material, i.e., cobalt, therefrom to a depth of approximately 0.075 mm. After the leaching treatment was completed, the treated diamond-bonded compact was again loaded into the HPHT device and a replacement material in the form of a silicon metal disk was positioned adjacent the treated region. The HPHT device was operated to impose approximately 5,500 MPa and approximately 1,250° C. for a period of approximately 10 minutes. During which time the silicon material melted and infiltrated into the treated region to fill the empty voids and pores created by removing the catalyst material, and reacted with the diamond crystals to form a reaction product therewith.

The resulting thermally stable diamond-bonded compact was removed from the device and examined to reveal that the diamond-bonded body included a thermally diamond-bonded region of approximately 0.075 mm thick having a microstructure characterized by a polycrystalline diamond matrix first phase and a second phase that occupy at least some population of the empty voids, and that comprises SiC with possibly some minor amounts of unreacted silicon. This thermally stable diamond-bonded region was well bonded to a PCD region of the diamond-bonded region that was approximately 1 mm thick that was attached to the WC—Co substrate having a layer thickness of approximately 12 mm.

A key feature of thermally stable diamond-bonded materials and compacts of this invention is that they comprise a diamond-bonded body having both a thermally-stable region and a PCD region. The thermally stable diamond-bonded region is specially engineered to be substantially free of the catalyst material used to form the PCD region, and is formed using a replacement material that operates to fill at least a population of the voids and pores caused by such removal, thereby providing a resulting material microstructure having an improved degree of mechanical strength. Further, the replacement material is specially selected to have a melting temperature that is less than that of the catalyst material within the PCD region to avoid reinfiltration of the catalyst material therein, thereby providing improved properties of thermal stability.

Further, the replacement material is specially chosen to react with the diamond in the remaining polycrystalline diamond matrix phase to form a reaction product that serves to both provide further mechanical strengthening of the region and that has thermal properties that are more closely matched to the polycrystalline diamond matrix phase to provide further enhanced thermal stability to the region. Further, thermally stable diamond-bonded compacts of this invention include a substrate, thereby enabling compacts of this invention to be attached by conventional methods such as brazing or welding to variety of different tooling, cutting and/or wear devices by conventional method, e.g., by welding or brazing, to greatly expand the types of potential use applications for compacts of this invention.

Thermally stable diamond-bonded materials and compacts of this invention can be used in a number of different applications, such as tools for mining, cutting, machining and construction applications, where the combined properties of thermal stability, strength/toughness, and wear and abrasion resistance are highly desired. Thermally stable diamond-bonded materials and compacts of this invention are particularly well suited for use as working, wear and/or cutting components in machine tools and drill and mining bits, such as roller cone rock bits, percussion or hammer bits, diamond bits, and shear cutters used for drilling subterranean formations.

FIG. 8 illustrates an embodiment of a thermally stable diamond-bonded compact of this invention provided in the form of an insert 70 used in a wear or cutting application in a roller cone drill bit or percussion or hammer drill bit. For example, such inserts 70 can be formed from blanks comprising a substrate portion 72 formed from one or more of the substrate materials disclosed above, and a diamond-bonded body 74 having a working surface 76 formed from the thermally stable region of the diamond-bonded body. The blanks are pressed or machined to the desired shape of a roller cone rock bit insert.

FIG. 9 illustrates a rotary or roller cone drill bit in the form of a rock bit 78 comprising a number of the wear or cutting inserts 70 disclosed above and illustrated in FIG. 8. The rock bit 78 comprises a body 80 having three legs 82, and a roller cutter cone 84 mounted on a lower end of each leg. The inserts 70 can be fabricated according to the method described above. The inserts 70 are provided in the surfaces of each cutter cone 84 for bearing on a rock formation being drilled.

FIG. 10 illustrates the inserts 70 described above as used with a percussion or hammer bit 86. The hammer bit comprises a hollow steel body 88 having a threaded pin 90 on an end of the body for assembling the bit onto a drill string (not shown) for drilling oil wells and the like. A plurality of the inserts 70 is provided in the surface of a head 92 of the body 88 for bearing on the subterranean formation being drilled.

Figure 11:
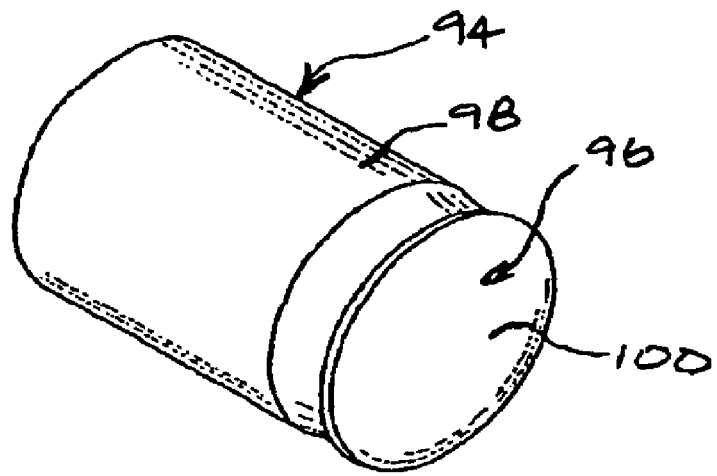
FIG. 11 is a schematic perspective side view of a diamond shear cutter comprising the thermally stable diamond-bonded compacts of this invention.

FIG. 11 illustrates a thermally stable diamond-bonded compact of this invention as embodied in the form of a shear cutter 94 used, for example, with a drag bit for drilling subterranean formations. The shear cutter 94 comprises a diamond-bonded body 96 that is sintered or otherwise attached to a cutter substrate 98. The diamond-bonded body 96 includes a working or cutting surface 100 that is formed from the thermally stable region of the diamond-bonded body.

Figure 12:
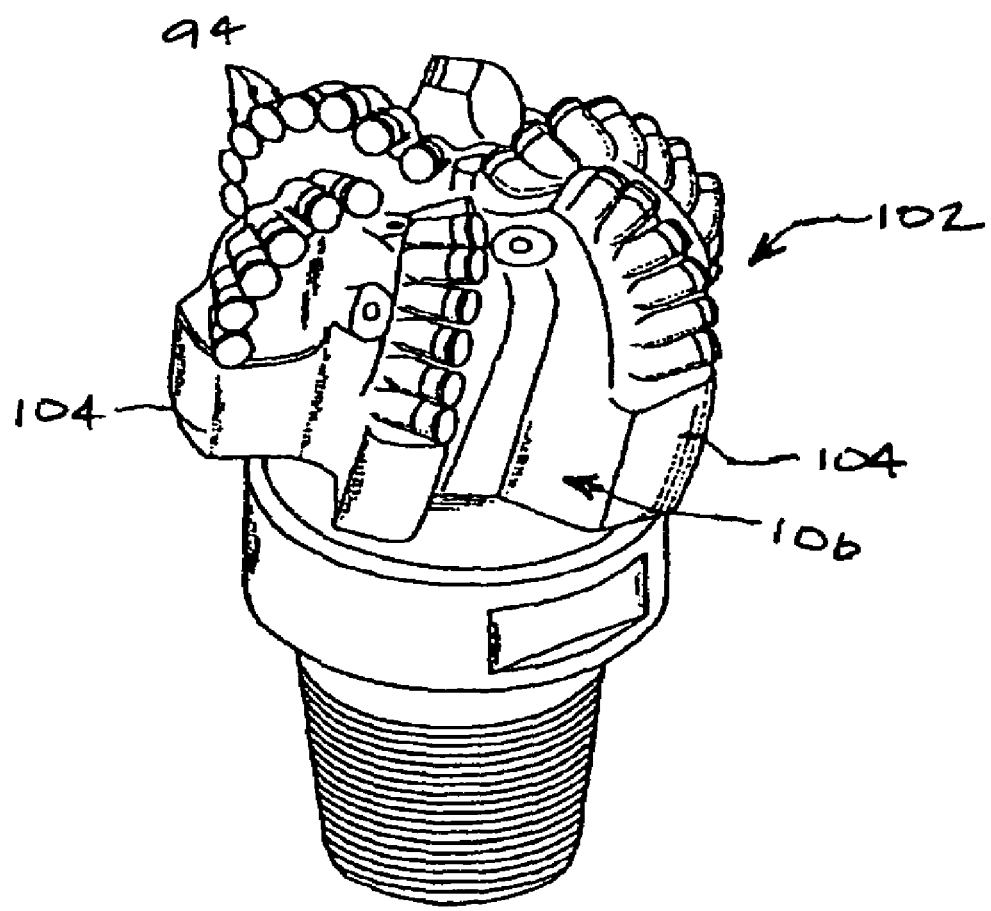
FIG. 12 is a perspective side view of a drag bit comprising a number of the shear cutters of FIG. 11.

FIG. 12 illustrates a drag bit 102 comprising a plurality of the shear cutters 94 described above and illustrated in FIG. 11. The shear cutters are each attached to blades 104 that extend from a head 106 of the drag bit for cutting against the subterranean formation being drilled.

Other modifications and variations of diamond-bonded bodies comprising a thermally-stable region and thermally stable diamond-bonded compacts formed therefrom will be apparent to those skilled in the art. It is, therefore, to be understood that within the scope of the appended claims, this invention may be practiced otherwise than as specifically described.

What is claimed is:

1. A thermally stable diamond-bonded compact comprising:
    a diamond-bonded body comprising;
    a thermally stable region extending a depth from diamond-bonded body surface, the thermally stable region having a material microstructure comprising a first matrix phase of intercrystalline bonded diamond, and a second phase interposed within the matrix phase;
    a polycrystalline diamond region extending a depth from the thermally stable region and having a material microstructure comprising a polycrystalline diamond matrix phase and a catalyst material disposed within interstitial regions of the matrix phase; and
    a substrate attached to the polycrystalline diamond region;
        wherein the second phase comprises a reaction product formed between an infiltrant material and the diamond at high pressure/high temperature conditions, and wherein the thermally stable region is substantially free of the catalyst.

2. The compact as recited in claim 1 wherein the reaction product has one or more thermal characteristics that more closely match that of the bonded diamond when compared to the catalyst material.

3. The compact as recited in claim 1 wherein the thermally stable region extends a depth from the surface of less than about 0.1 mm.

4. The compact as recited in claim 1 wherein the thermally stable region extends a depth from the surface of greater than about 0.1 mm.

5. The compact as recited in claim 1 wherein the infiltrant material has a melting temperature below that of the catalyst material.

6. The compact as recited in claim 1 wherein the infiltrant material has thermal characteristics that more closely match that of the bonded diamond when compared to the catalyst material.

7. The compact as recited in claim 1 wherein the infiltrant material is silicon.

8. The compact as recited in claim 1 wherein the reaction product is silicon carbide.

9. The compact as recited in claim 1 wherein the thermally stable region further comprises a plurality of empty voids, and wherein the second phase occupies at least some population of the empty voids.

10. The compact as recited in claim 1 wherein the second phase comprises more than one reaction product formed by reaction of more than one infiltrant with the diamond.

11. The compact as recited in claim 1 wherein the thermally stable region second phase comprises two or more reaction products.

12. The compact as recited in claim 11 wherein the thermally stable region comprises one second phase comprising a first reaction product positioned in one location of the thermally stable region, and comprises another second phase comprising a second reaction product that is positioned in a location of the thermally stable region different from first reaction product.

13. A bit for drilling subterranean formations comprising a body and a plurality of cutting elements attached thereto, one or more of the cutting elements comprising the compact as recited in claim 1.

14. A thermally stable diamond-bonded compact comprising:
    a diamond-bonded body comprising;
    a thermally stable region extending a depth from diamond-bonded body surface, the thermally stable region having a material microstructure comprising a first matrix phase of intercrystalline bonded diamond, and a second phase interposed within the matrix phase;
    a polycrystalline diamond region extending a depth from the thermally stable region and having a material microstructure comprising a polycrystalline diamond matrix phase and a catalyst material disposed within interstitial regions of the matrix phase; and
    a substrate attached to the diamond-bonded body;
        wherein the second phase comprises a reaction product formed between a replacement material and the diamond and that bonds a population of the diamond together, wherein the replacement material was not used to initially sinter the diamond-bonded body at high pressure/high temperature conditions, and wherein the thermally stable region is substantially free of the catalyst material.

15. The compact as recited in claim 14 wherein the replacement material is selected from the group of material that have a melting temperature that is below the temperature of the catalyst material in the polycrystalline diamond region.

16. A bit for drilling subterranean formations comprising:
    a body;
    a number of blades extending from the body; and
    a plurality of cutting elements attached to one or more of the blades;
wherein the cutting elements comprise a thermally stable diamond-bonded compact comprising:
    a thermally stable region extending a depth from diamond-bonded body surface, the thermally stable region having a material microstructure comprising a first matrix phase of intercrystalline bonded diamond, and a second phase interposed within the matrix phase;
    a polycrystalline diamond region extending a depth from the thermally stable region and having a material microstructure comprising a polycrystalline diamond matrix phase and a catalyst material disposed within interstitial regions of the matrix phase; and
    a substrate attached to the diamond-bonded body;
    wherein the second phase comprises a reaction product formed between a replacement material and the diamond and that bonds a population of the diamond together, wherein the replacement material was not used to initially sinter the diamond-bonded body at high pressure/high temperature conditions, and wherein the thermally stable region is substantially free of the catalyst material.

17. The bit as recited in claim 16 wherein the replacement material is selected from the group of material that have a melting temperature that is below the temperature of the catalyst material in the polycrystalline diamond region.

* * * * *